D. FASIG.
Feeding Device for Straw Cutters.
No. 29,868.  Patented Sept. 4, 1860.
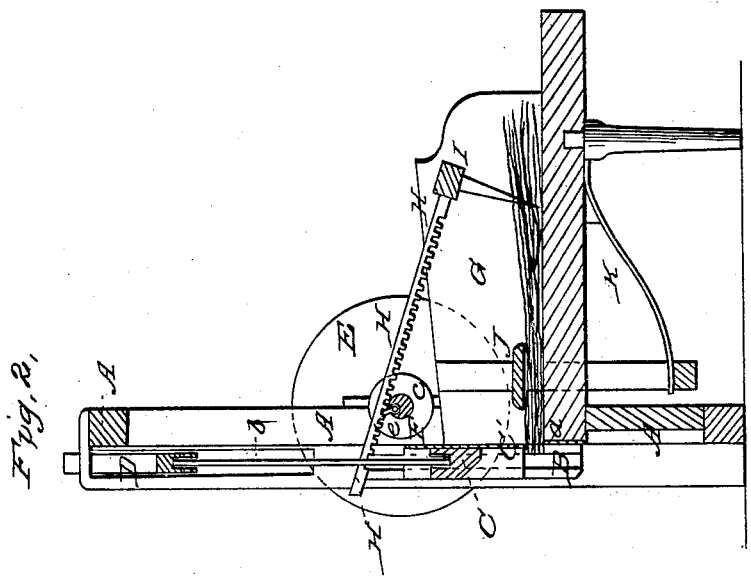
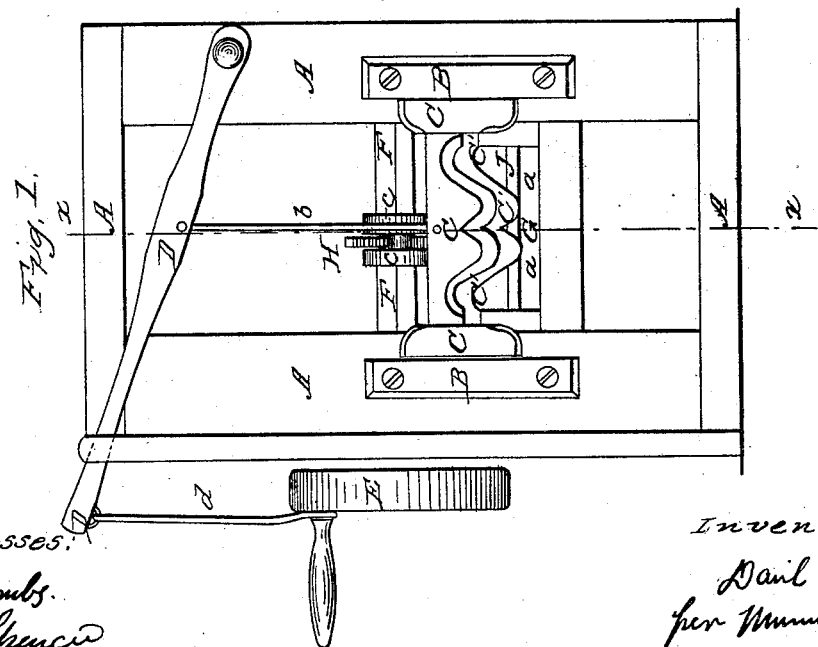

UNITED STATES PATENT OFFICE.

DANIEL FASIG, OF ROWSBURG, OHIO.

FEEDER FOR STRAW-CUTTERS.

Specification of Letters Patent No. 29,868, dated September 4, 1860.

*To all whom it may concern:*

Be it known that I, DANIEL FASIG, of Rowsburg, in the county of Ashland and State of Ohio, have invented a new and Improved Feeder for Straw-Cutters; and I do hereby declare that the following is a full, clear, and exact description thereof, reference being had to the accompanying drawings, making part of this specification, in which—

Figure 1 represents a front view of the straw cutter. Fig. 2 is a longitudinal section taken in the vertical plane indicated by red line $x$, $x$, Fig. 2.

Similar letters of reference indicate corresponding parts in both figures.

This invention is a self-feeder for moving the straw or stalks to be cut up to the cutters as they are operated.

It consists in operating a rake by a novel arrangement so as to give to it an advancing movement up to the cutters at each revolution of the crank shaft that operates the knife, said movement of the rake being regulated at pleasure to cut the straw longer or shorter as will be hereinafter described and represented.

To enable those skilled in the art to fully understand my invention, I will proceed to describe its construction and operation.

In the drawings A is an upright frame, B are slotted guides for the knife frame C, C' is the movable knife with its cutting edge shaped as represented for giving a draw cut against the fixed cutting edge $a$, $b$ is a rod jointed to the knife frame C, and connecting with the lever D. Lever D, is pivoted at one end to frame A, and connects eccentrically with a balance crank wheel E by a connecting rod $d$. The lever D plays up and down in a slot in frame A. By turning wheel E, the knife frame with its knife is moved up and down.

The horizontal shaft F, of wheel E, has its bearings in the back of frame A, just over the mouth of straw box G, and on this shaft are placed two flanges $c$, $c$, between which is placed a rack handle H of the rake I.

$e$ is a tooth that projects from the shaft F, between the two flanges $c$, $c$, which tooth may be drawn out, lengthened or shortened at pleasure. The rake teeth rest on the bottom of the straw box G, and its handle, between the flanges on the shaft. Now by rotating the shaft F, the tooth $e$ will move the rake forward, the distance of the teeth apart in the rack, at each rotation, and by lengthening the tooth, drawing it out farther from the axis of the shaft, the advancing movement of the rake will be increased at each rotation of the shaft, when the rake has thus been drawn up to the shaft F, it may be put back to its original position with the hand or by reversing the movement of the shaft F.

J, is the pressure board acted upon by a spring K, to keep the straw in the box G, compact near the mouth of the box.

Having thus described my invention, what I claim as new and desire to secure by Letters Patent, is:

The combination with shaft F, of the flanges $c$ $c$, tooth $e$, rack handle H, and rake I, arranged and made to operate in the manner and for the purpose herein set forth.

DANIEL FASIG.

Witnesses:
A. H. CRAWFORD,
C. H. DORLAND.